UNITED STATES PATENT OFFICE.

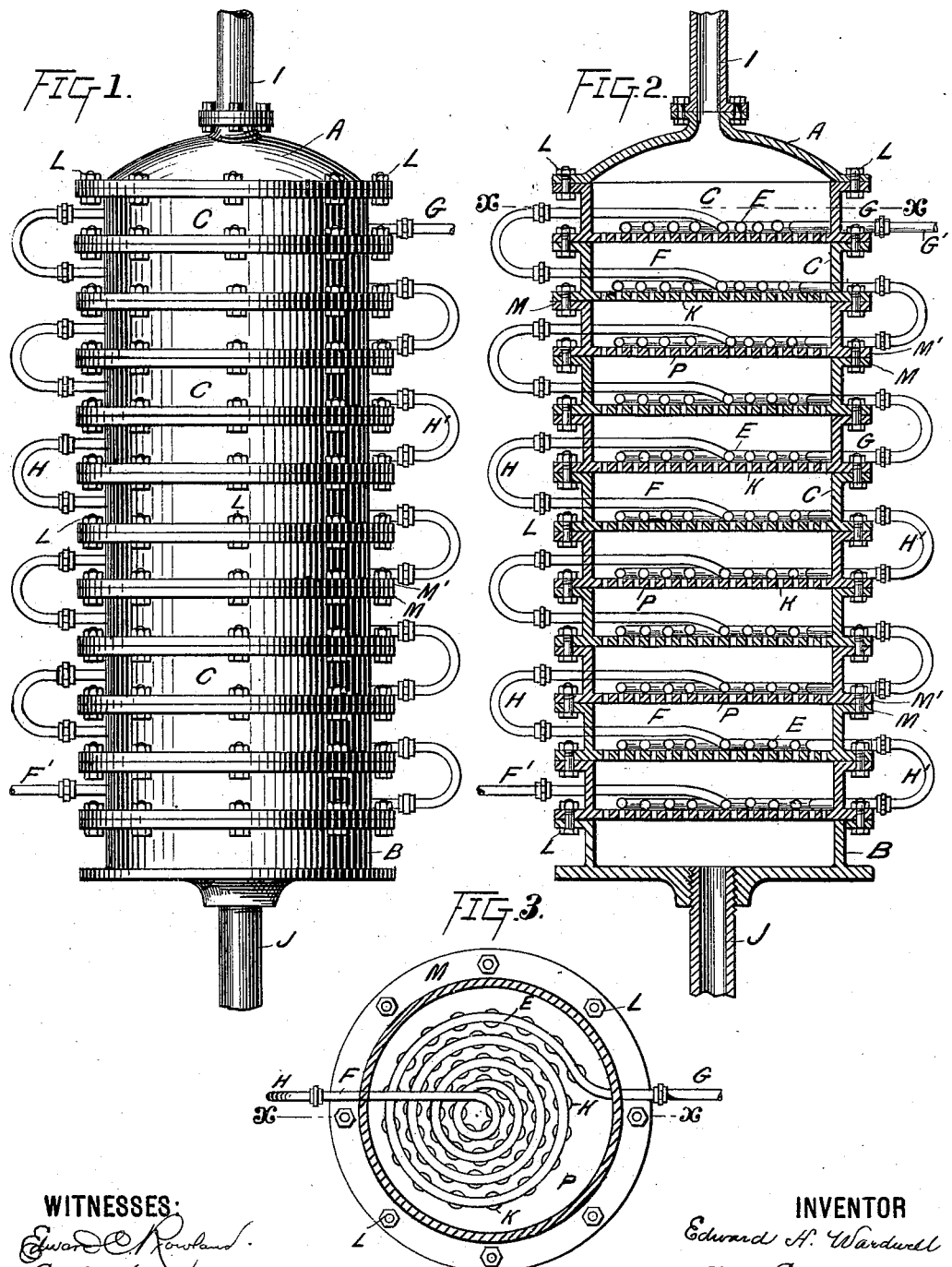

EDWARD H. WARDWELL, OF SOUTH ORANGE, NEW JERSEY.

CONDENSER.

SPECIFICATION forming part of Letters Patent No. 521,838, dated June 26, 1894.

Application filed March 27, 1891. Serial No. 386,624. (No model.)

*To all whom it may concern:*

Be it known that I, EDWARD H. WARDWELL, a citizen of the United States, and a resident of South Orange, in the county of Essex and State of New Jersey, have invented certain new and useful Improvements in Condensers, of which the following is a specification.

My invention relates to improvements in condensers, and applies more particularly to that form of condenser which is used for the purpose of reducing heated gaseous or vaporous bodies to a liquid state.

The objects of my invention are:—First:—To so form and shape the component parts of a condenser that it may be made of any desired size by combining a greater or less number of such parts together. Second:—To so arrange the parts of a condenser that a very large cooling surface will be exposed to the heated vapors or gases to be condensed and so that all the heated vapors or gases will be brought into intimate contact with such cooling surface. Third:—To so form a condenser that it can be easily and quickly taken apart and put together so that it may be cleaned and repaired when necessary. Fourth:—To so form a condenser that the heated body to be condensed shall entirely give up its heat and be completely cooled when it leaves the condenser, and, fifth:—To so construct a condenser that it cannot become clogged or stopped up by such bodies as tend to crystallize when condensed from a vaporous to a liquid state. I attain these objects in the following manner; reference being had to the accompanying drawings forming part of this application, in which like parts are designated by similar letters of reference.

Figure 1 is a side elevation. Fig. 2 is a vertical section, and Fig. 3 is a horizontal section of my improved condenser.

In the drawings the condenser is shown as being composed of a series of shallow vessels C, arranged one on top of the other and bolted together by bolts L. These shallow vessels are open at the top, the bottom of one serving as the cover or top for the next one in the series; their bottoms P, are perforated with a series of holes K, and they are provided at the top and bottom with projecting flanges M, M', through which the bolts L, which hold them together pass, the joints so formed between them being rendered tight by gaskets or in any well-known manner. The upper vessel of the series is covered by a dome shaped top A, provided with the inlet pipe I, and the bottom is closed by the cap B, provided with the outlet pipe J. Inside each of the shallow vessels C, is a flat coil of pipe E, which rests upon the perforated bottom P. The ends F and G of these coils are passed through the walls of the vessels C, and on opposite sides, as shown in Fig. 3, the joint between the pipes F and G and the walls of C being made tight in any suitable manner. The end F of one coil is then connected to the end F of the next coil in the series by a coupling H, and the ends G, G, are also coupled in a similar manner by the coupling H' thus forming continuous coils E, throughout the whole apparatus, one end G' being left for an inlet and the other end F' being left for an outlet, as shown.

In using this apparatus as a condenser, the heated gas or vapor to be condensed passes in at the pipe I, through the perforations K at the bottom of each of the vessels C, in succession and finally out at the outlet pipe J. The pipe G' is connected to a suitable source of supply of some cold fluid such as water, which passes through each of the coils E, in succession and finally off and out at the outlet F'. This cold fluid in passing through the coils E, absorbs the heat from the heated vapors or gases, passing through the chamber C, cooling them down and condensing them; the fluid so formed passing along with the vapors or gases through the perforations K, from chamber to chamber being more and more cooled until at its issue at the outlet pipe J, it has parted with all its heat and is completely cooled.

It is only necessary to employ a sufficiently large number of the vessels C, to completely condense and cool any vapor or gas heated to any degree of heat, and this is readily accomplished, as all of the vessels C, are alike and the series can be made as long as desired by adding one to the other. It will also be seen that such an arrangement gives a very large amount of cooling surface and can be easily and quickly taken apart and put together at any point by means of the bolts L. It will also be seen that if the fluids formed by condensation from such vapors or gases are of such a character that they tend to crystallize and clog up the holes K, the apparatus can easily be cleared and the clogging removed by passing a stream of any suitable fluid through the apparatus by means of pipe I, thus breaking up and removing such obstacles.

This form of condenser can be used for a variety of purposes, such as a feed water heater, the exhaust steam from an engine being passed through the vessels C, from pipe I to pipe J and the feed water being passed through the coils E, from pipe G' to pipe F', absorbing the heat from the exhaust steam, condensing it to water and being itself in turn heated to a high degree of heat.

What I claim as my invention, and desire to secure by Letters Patent, is—

A condenser consisting of a series of superposed vessels C, each having a top and a bottom flange whereby adjacent vessels may be joined, and each vessel having a perforated bottom, and coils of pipe laid within said vessels, the coil of one vessel being connected with and thereby rendered continuous of the coil of the next adjacent vessel or vessels, substantially as described.

Signed at New York, in the county of New York and State of New York, this 18th day of March, A. D. 1891.

EDWARD H. WARDWELL.

Witnesses:
E. R. KNOWLES,
E. V. MYERS.